(12) United States Patent
Hsieh

(10) Patent No.: US 6,212,194 B1
(45) Date of Patent: Apr. 3, 2001

(54) NETWORK ROUTING SWITCH WITH NON-BLOCKING ARBITRATION SYSTEM

(75) Inventor: Wen-Jai Hsieh, Palo Alto, CA (US)

(73) Assignee: I-Cube, Inc., Campbell, CA (US)

( * ) Notice: Subject to any disclaimer, the term of this patent is extended or adjusted under 35 U.S.C. 154(b) by 0 days.

(21) Appl. No.: 09/129,982

(22) Filed: Aug. 5, 1998

(51) Int. Cl.[7] .......................... H04L 12/54; H04L 12/403
(52) U.S. Cl. .......................... 370/414; 370/423; 370/450; 370/462
(58) Field of Search .................... 370/398, 412, 370/413, 414, 415, 416, 417, 418, 422, 423, 424, 428, 429, 438, 439, 450, 451, 459, 461, 462, 447, 454

(56) References Cited

U.S. PATENT DOCUMENTS 5,689,644 * 11/1997 Chou et al. .

* cited by examiner

Primary Examiner—Wellington Chin
Assistant Examiner—Kwang B. Yao
(74) Attorney, Agent, or Firm—Daniel J. Bedell; Smith-Hill and Bedell

(57) ABSTRACT

A local area network routing switch for routing data transmissions between buses includes a set of input buffers, each for receiving and storing successive data transmissions arriving via a corresponding one of the bus. The switch also includes a set of output buffers for forwarding data transmissions outward via a corresponding bus, and a routing system for selectively routing data transmissions from the input buffers to the output buffers in response to routing requests from the input buffers. The routing system sends STATUS data to each input buffer indicating which output buffers are busy receiving data transmissions and which output buffers are idle. An input buffer makes a routing request only when it stores a data transmission to be forwarded to an idle output port. If its longest-stored data transmission is destined for a busy output port, it may send a routing request for a more recently stored data transmission if that data transmission is to be forwarded to an idle output buffer. Thus a busy output buffer will not block data transmission by an input buffer even though its longest-stored data transmission is to be routed to that output buffer.

10 Claims, 10 Drawing Sheets

NETWORK ROUTING SWITCH WITH NON-BLOCKING ARBITRATION SYSTEM

BACKGROUND OF THE INVENTION

1. Field of the Invention

Figure 1:
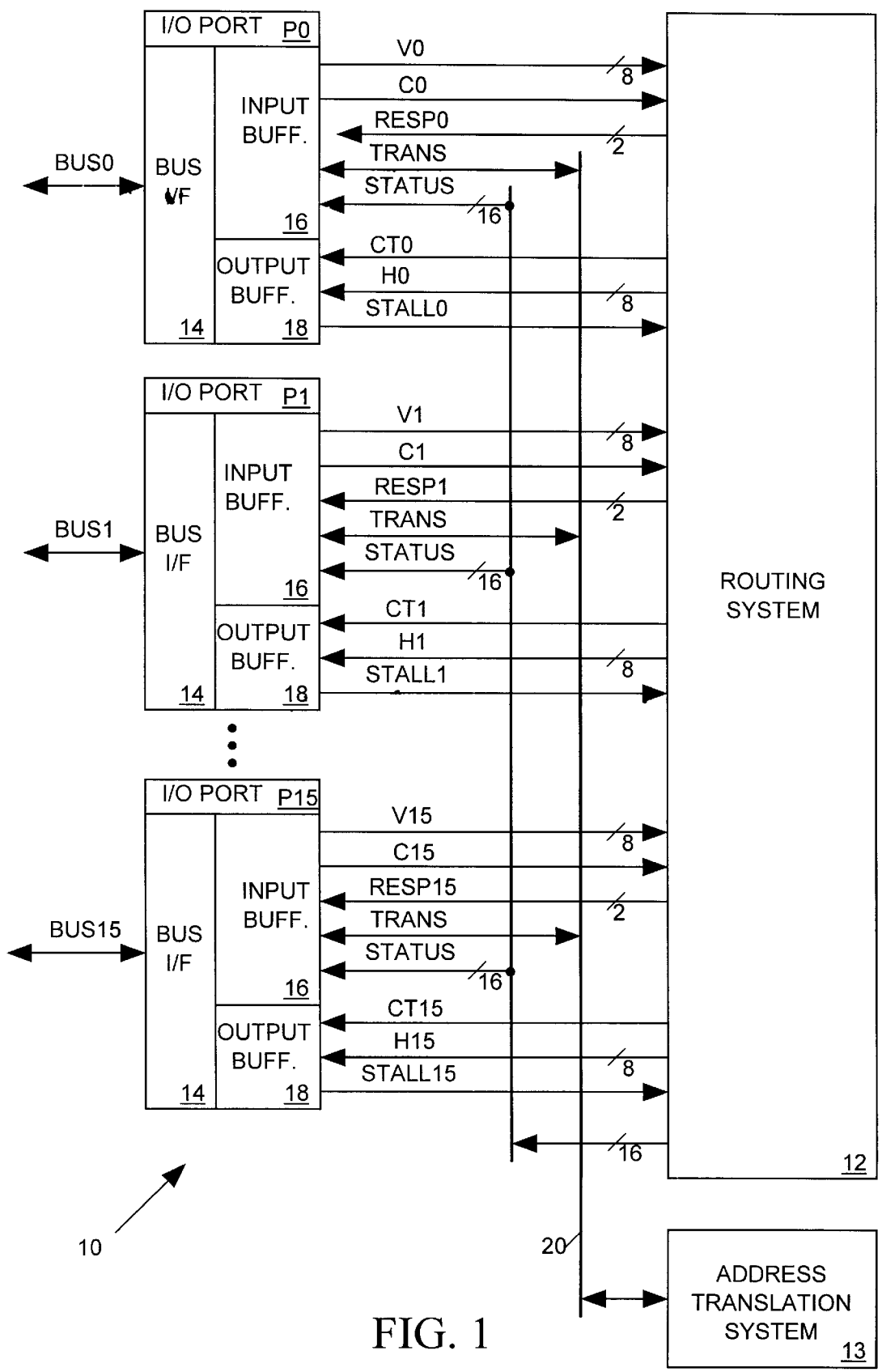

The present invention relates in general to a switch for routing data between buses, and in particular to a switch having a non-blocking arbitration system.

2. Description of Related Art

Networks route data transmissions between network stations. In some network system buses typically connect network stations to a central hub or switch. A network hub is simply a repeater receiving a data transmission (e.g. an Ethernet data packet or an ATM cell) arriving on any one input bus and rebroadcasting outward on all output buses. A header in the data packet or cell indicates the packet or cell destination. Each network station looks at the header to determine if it should accept or ignore the data transmission. One disadvantage to a hub repeater is that each bus carrying data transmissions to a network station not only must convey transmissions directed to that station but must carry packets directed to all other stations as well. That can put a heavy load on all hub output buses at times of high traffic and can reduce network throughput.

A network switch, on the other hand, routes an incoming data transmission outward only on the bus leading to its destination, thereby reducing the traffic load on network buses. A network switch typically includes input buffers for receiving and storing incoming transmissions from the network stations, output buffers for storing and then transmitting outgoing transmissions to the network stations and an intelligent routing system for selectively providing a data routing path for each incoming data transmission from an input buffer to the appropriate output buffer. Each input buffer typically stores each incoming transmission, determines the destination output buffer from the routing data included in the packet or cell header, and then requests the routing system to provide a data path between the input buffer and the destination output buffer. When the routing system establishes the data path, the input buffer sends the transmission to the output buffer via the data path.

Since input buffers may have competing routing requests, the routing system must include an arbitration system for determining which requests are granted. Such an arbitration system for an Ethernet network switch is described in U.S. Pat. No. 5,689,664 entitled "Network Switch With Arbitration System", issued Nov. 18, 1997 to Chou et al, (incorporated herein by reference). When Chou's arbitration system grants a request it signals the input buffer that made the request that it may begin forwarding a data packet to the output buffer via the switching mechanism. When the arbitration system thereafter learns that the data packet has been sent to the output buffer and that the output buffer is ready to receive another data packet, the arbitration system allows all input buffers to once again compete for a data routing path to the output buffer.

In Chou's network switch, an input buffer stores all incoming data packets but requests a data routing path only to the output buffer that is to receive its longest-stored data packet. If that output buffer is busy, the requesting input buffer is not only blocked from forwarding its longest-stored data packet to the busy output buffer, it is also blocked from forwarding any later stored data packet to other output buffers, even when they are idle.

What is needed is a network switch having an improved arbitration system wherein an input buffer storing a data transmission destined for a busy output buffer is not blocked from sending a subsequently stored data transmission to an idle output buffer.

SUMMARY OF THE INVENTION

A network switch in accordance with the present invention receives and stores each data transmission arriving at any of several input buses and then forwards the data transmission outward from the switch on an appropriate one of several output buses. The switch the includes a set of input buffers for receiving the transmissions, a set of output buffers for forwarding the transmissions and a routing system for selectively providing data paths for routing data transmissions from the input buffers to the output buffers. Each input buffer receives and stores each incoming data transmission arriving on a corresponding input bus and determines from routing information included in the data transmission which output port is to forward the data transmission outward from the switch. The input buffer then sends a routing request to the routing system requesting a data path to the appropriate output buffer. When the routing system establishes the data path, the input buffer sends the data transmission over that path to the output buffer. The output buffer stores the data transmission and then forwards it outward from the switch via a corresponding output bus.

In accordance the invention, the routing system sends STATUS data to each input buffer indicating whether each output buffer is busy receiving a data transmission from an input buffer or is idle and ready to receive a data transmission. When an input buffer is ready to forward a data transmission to an output buffer, it sends a routing request to the routing system requesting a data routing path to the destination output buffer for its longest-stored data transmission, provided that data transmission is to be forwarded to an idle output buffer, as indicated by the STATUS data. If the output buffer to receive an input buffer's longest-stored data transmission is busy, but an output buffer to receive a subsequently stored data transmission is idle, the input will request a data path to the idle output buffer and forward the later stored transmission when the routing system grants the request. Thus even though its longest-stored data transmission is destined to a busy output buffer, an input buffer is not prevented from forwarding subsequently received data transmissions to idle output buffers.

Accordingly, it is an object of the present invention to provide a network switch that allows an input buffer to forward data transmissions to idle output buffers even though the destination output buffer of its longest-stored data transmission is busy.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 2:
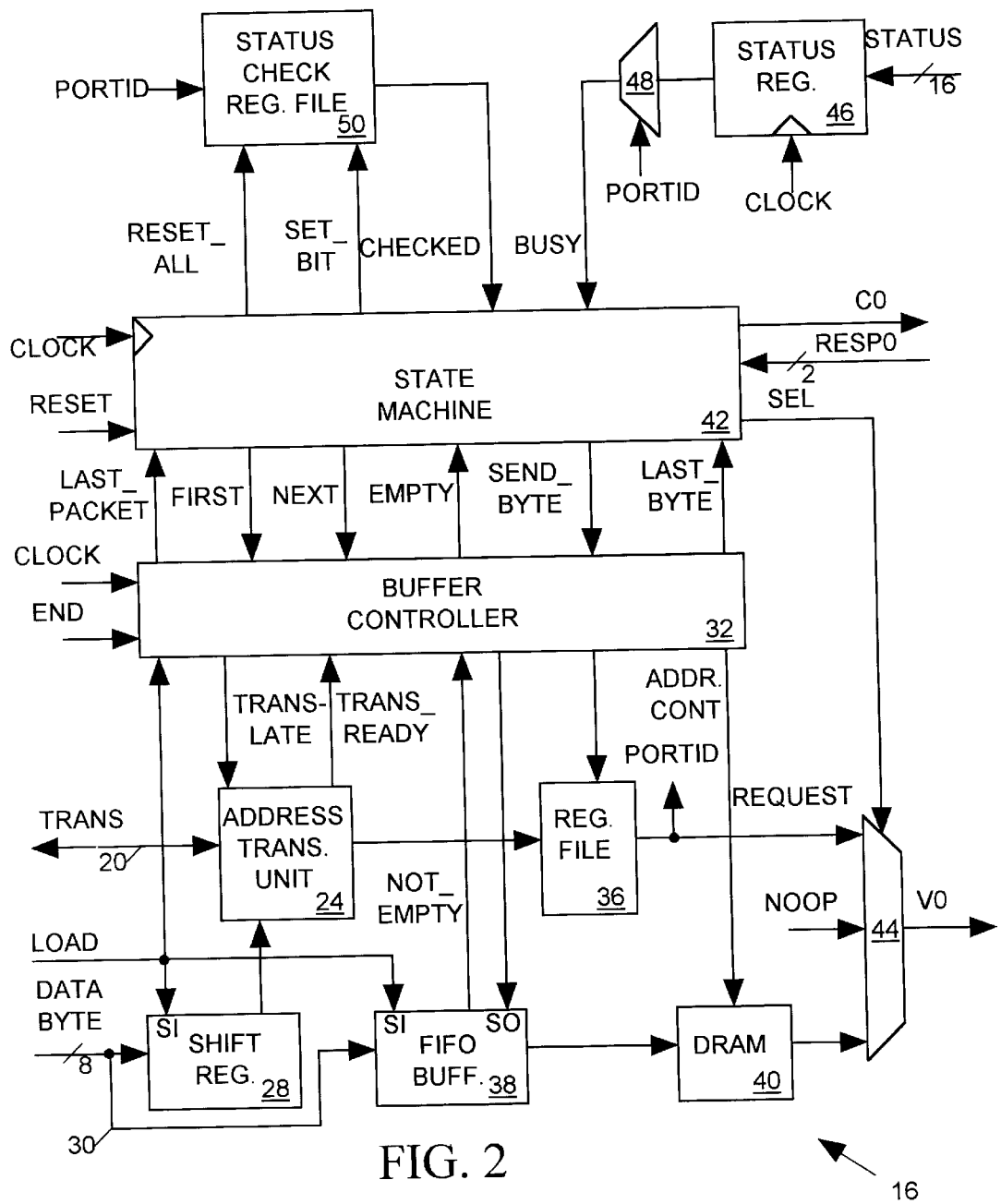
Figure 3:
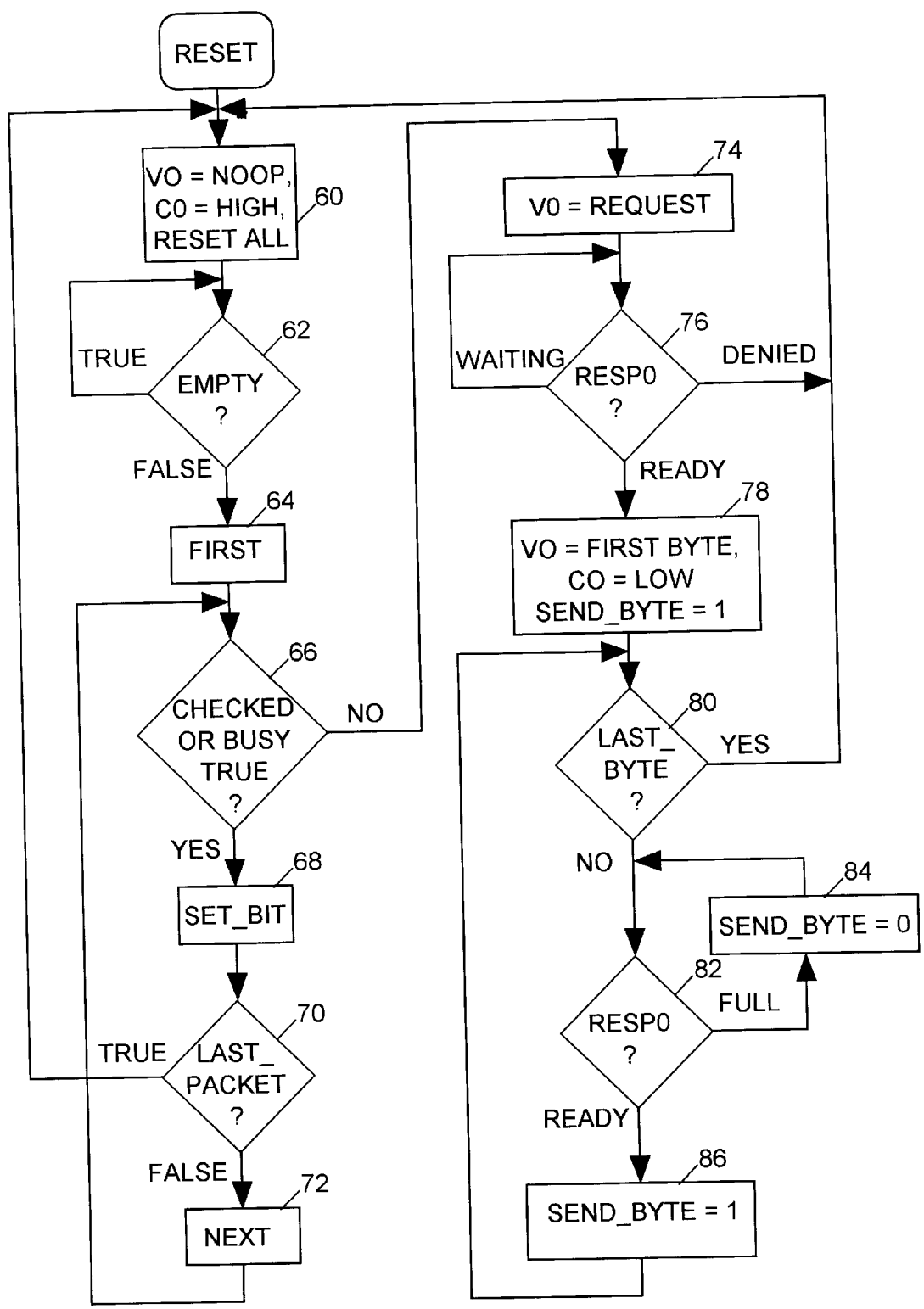
Figure 4:
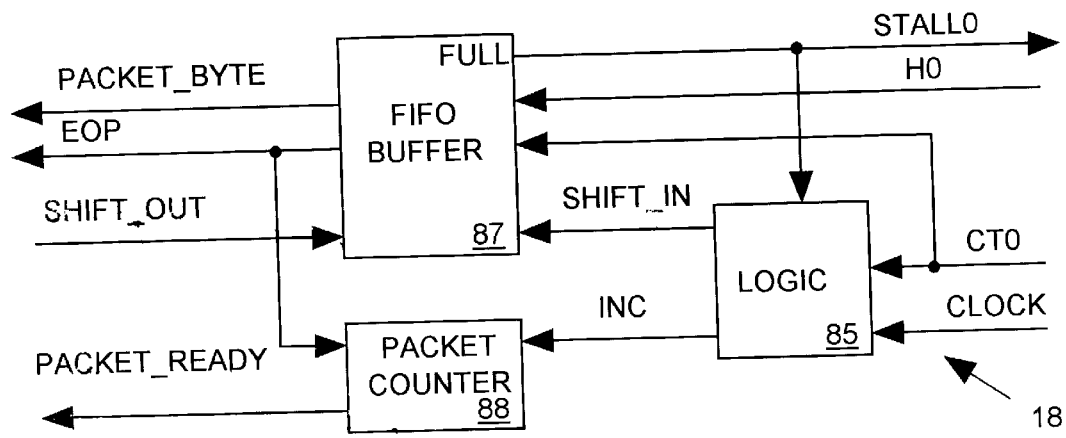
Figure 12:
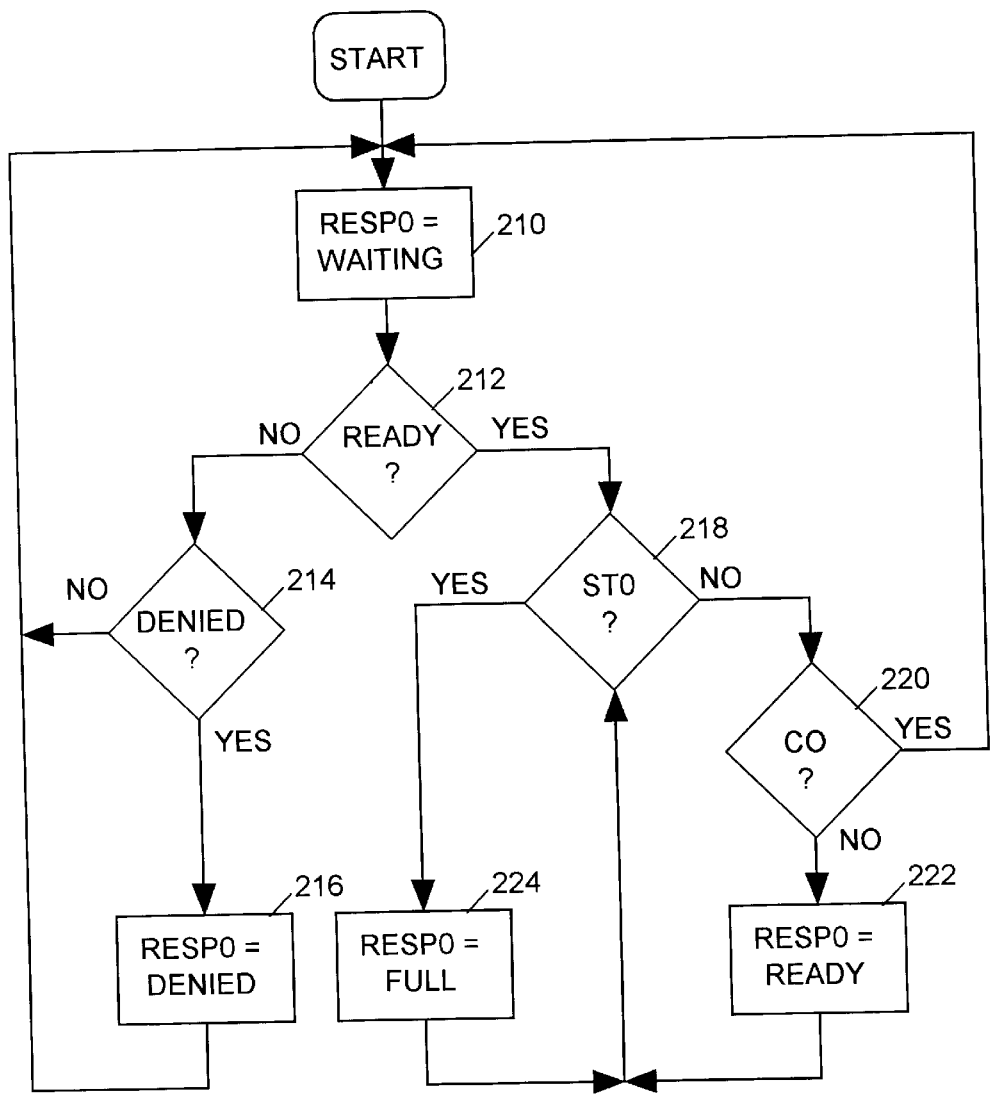
Figure 5:
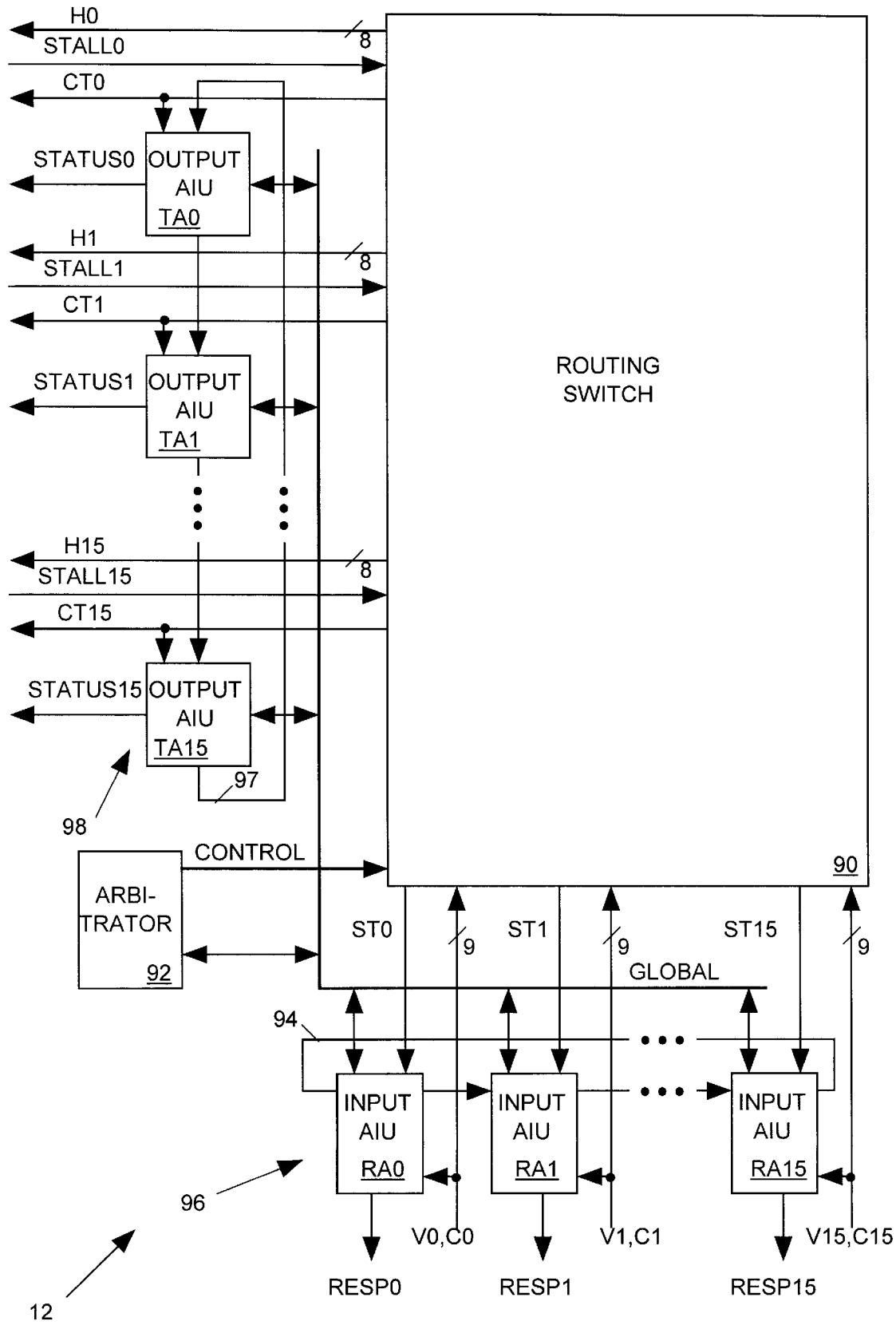
Figure 6:
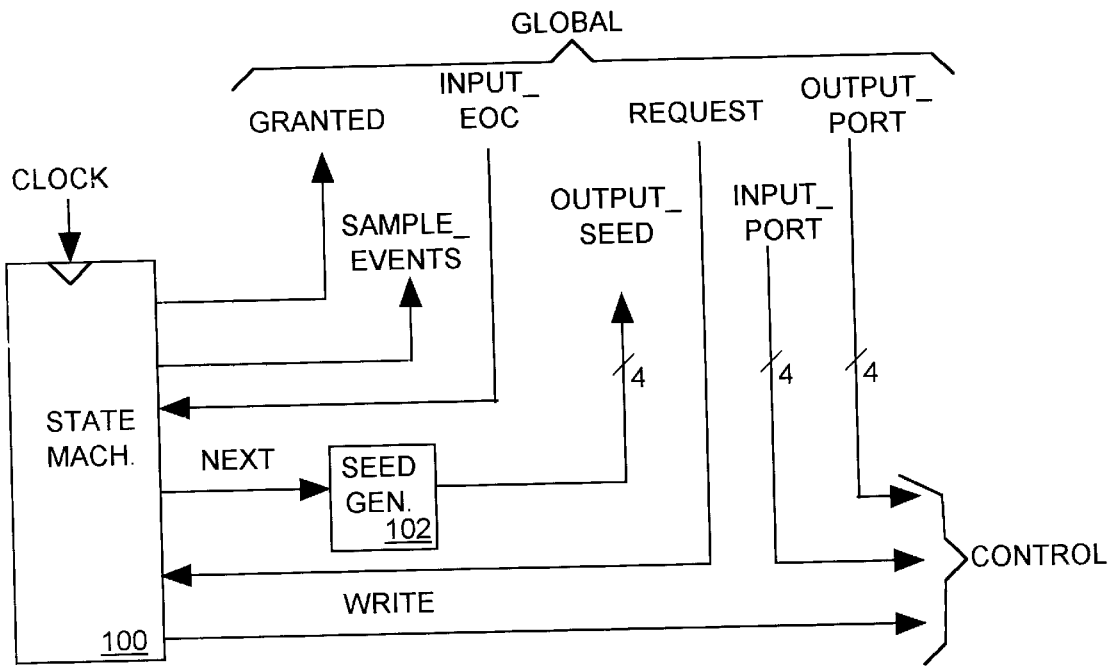
Figure 7:
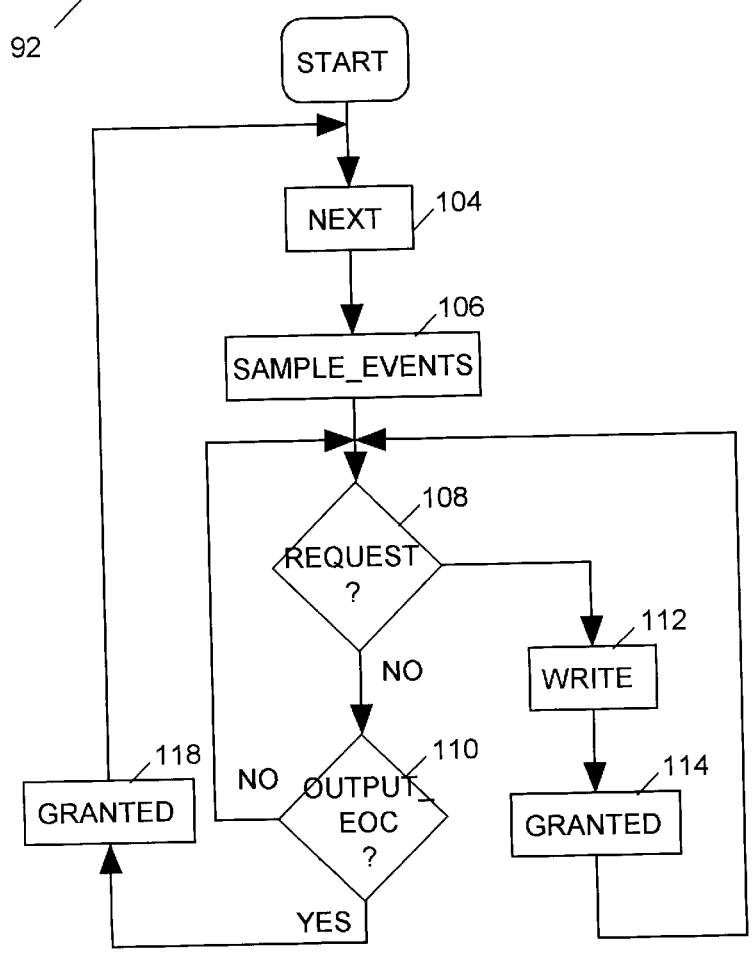
Figure 8:
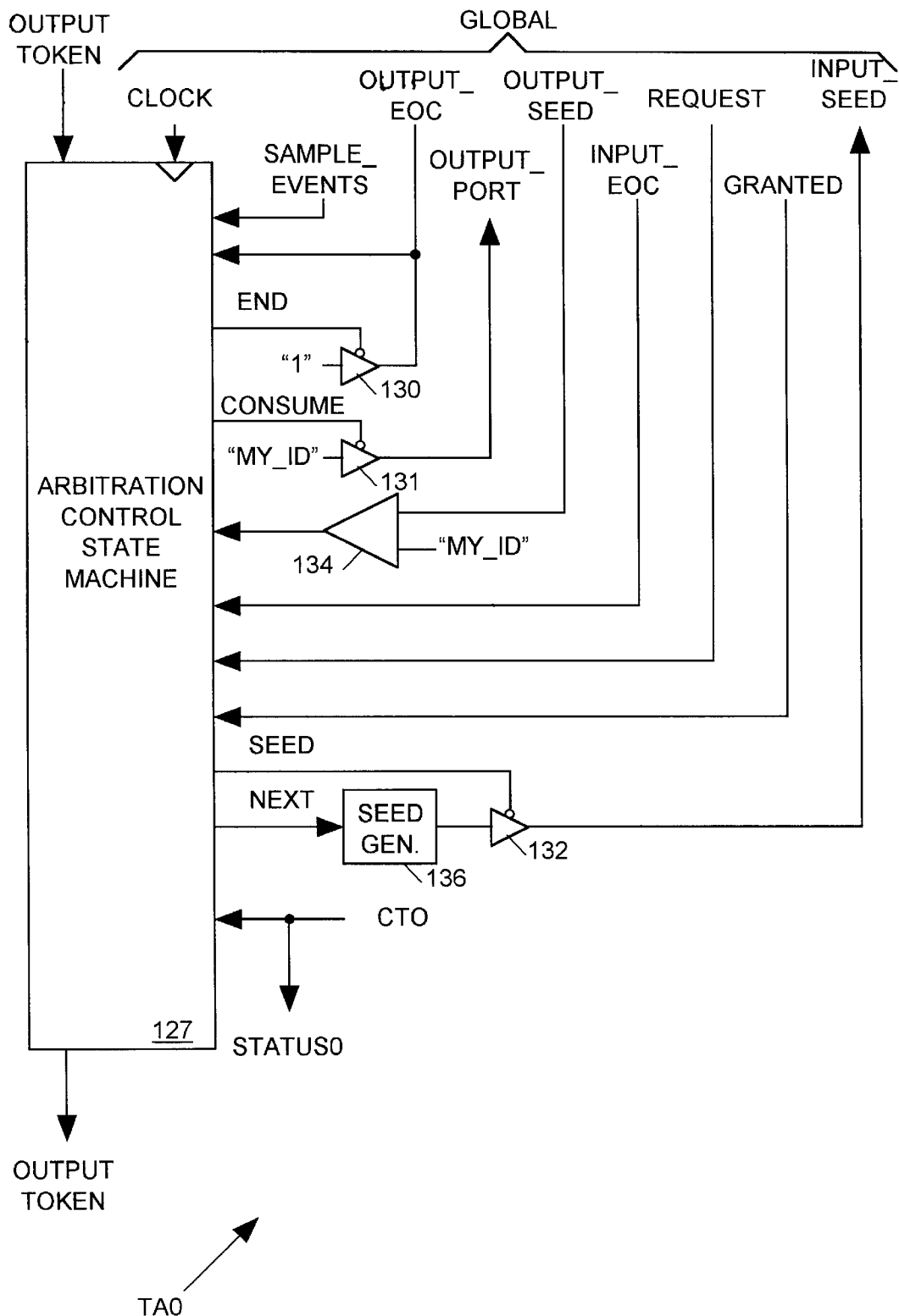
Figure 9:
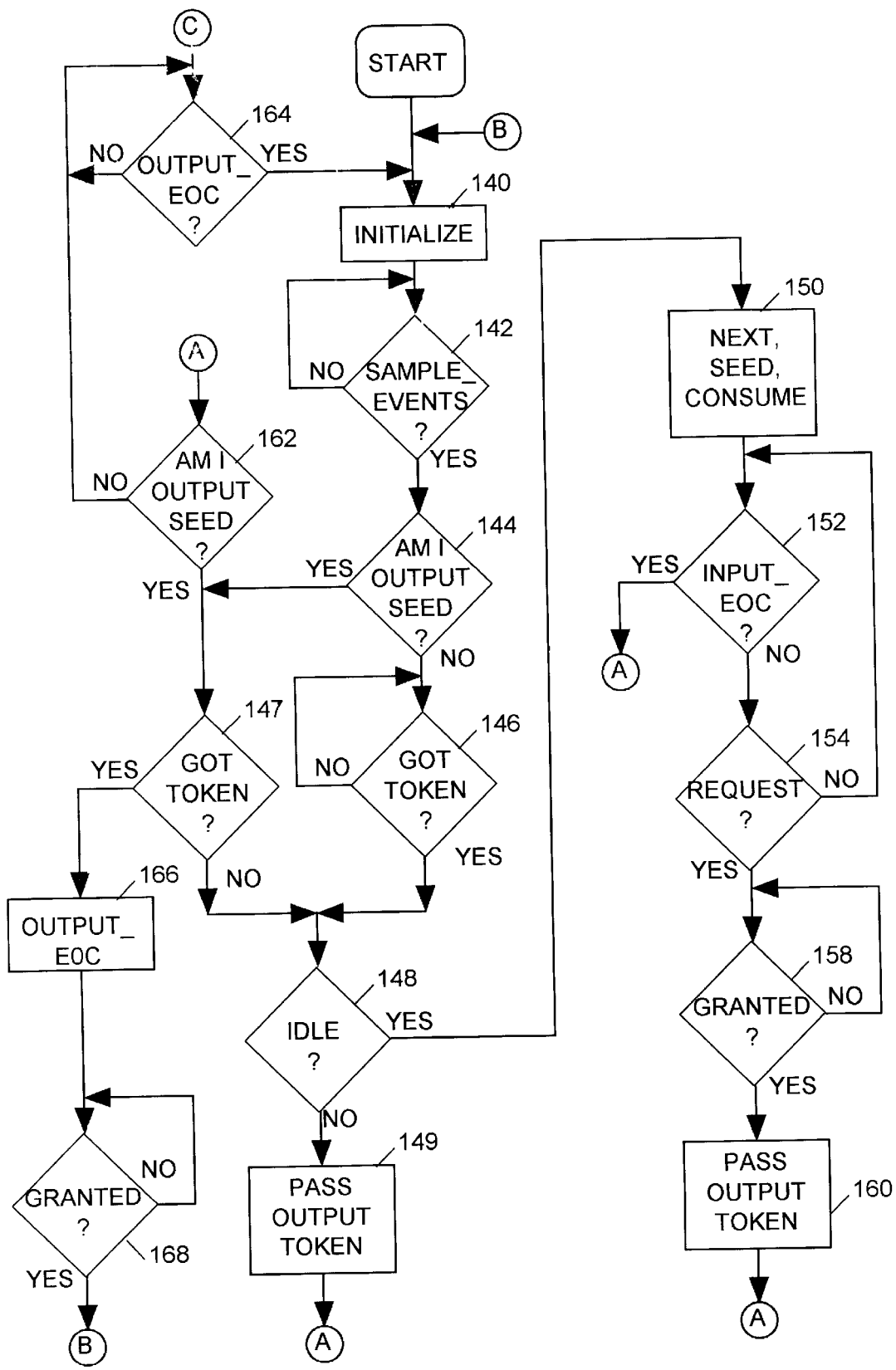
Figure 10:
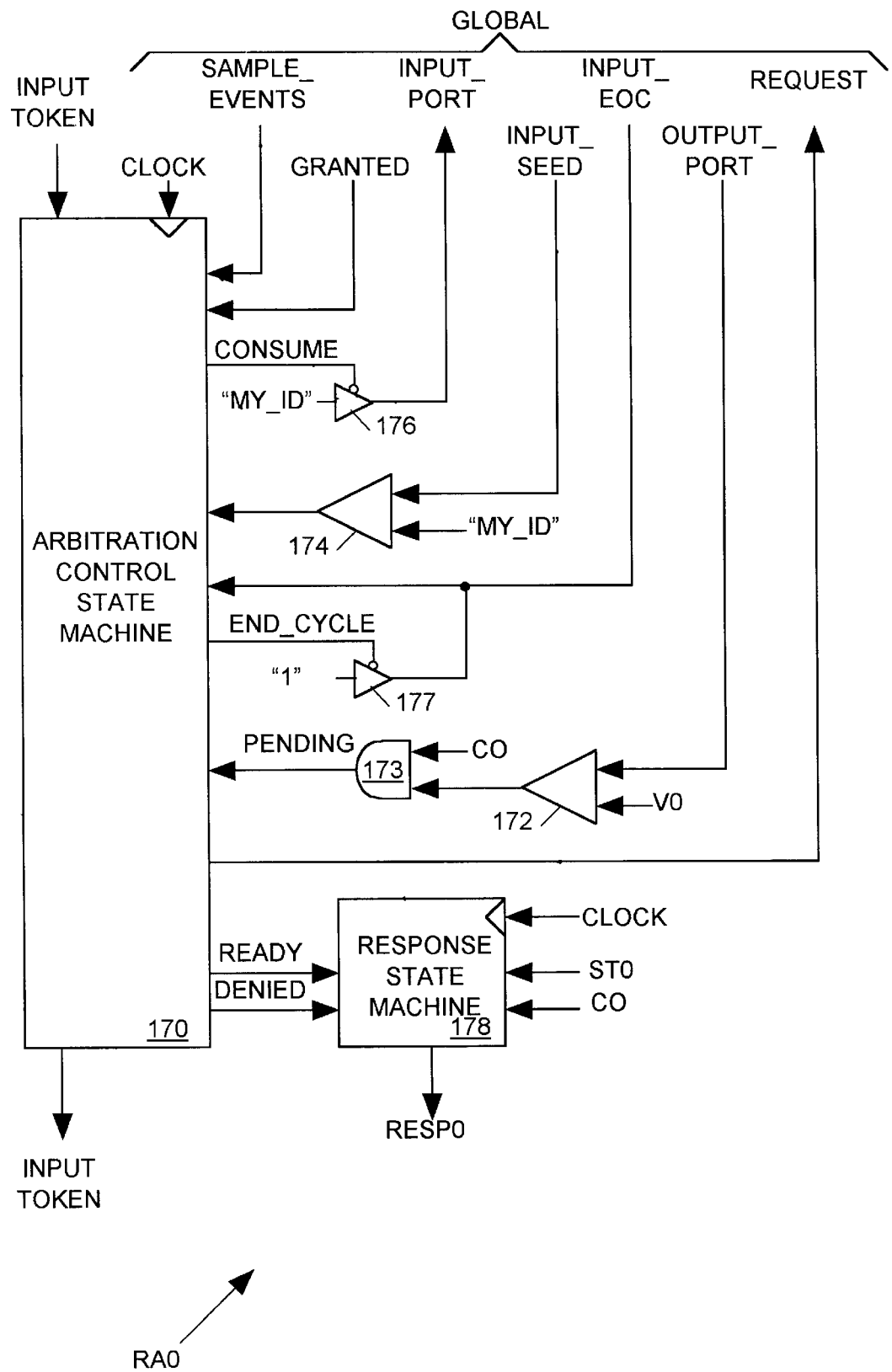
Figure 11:
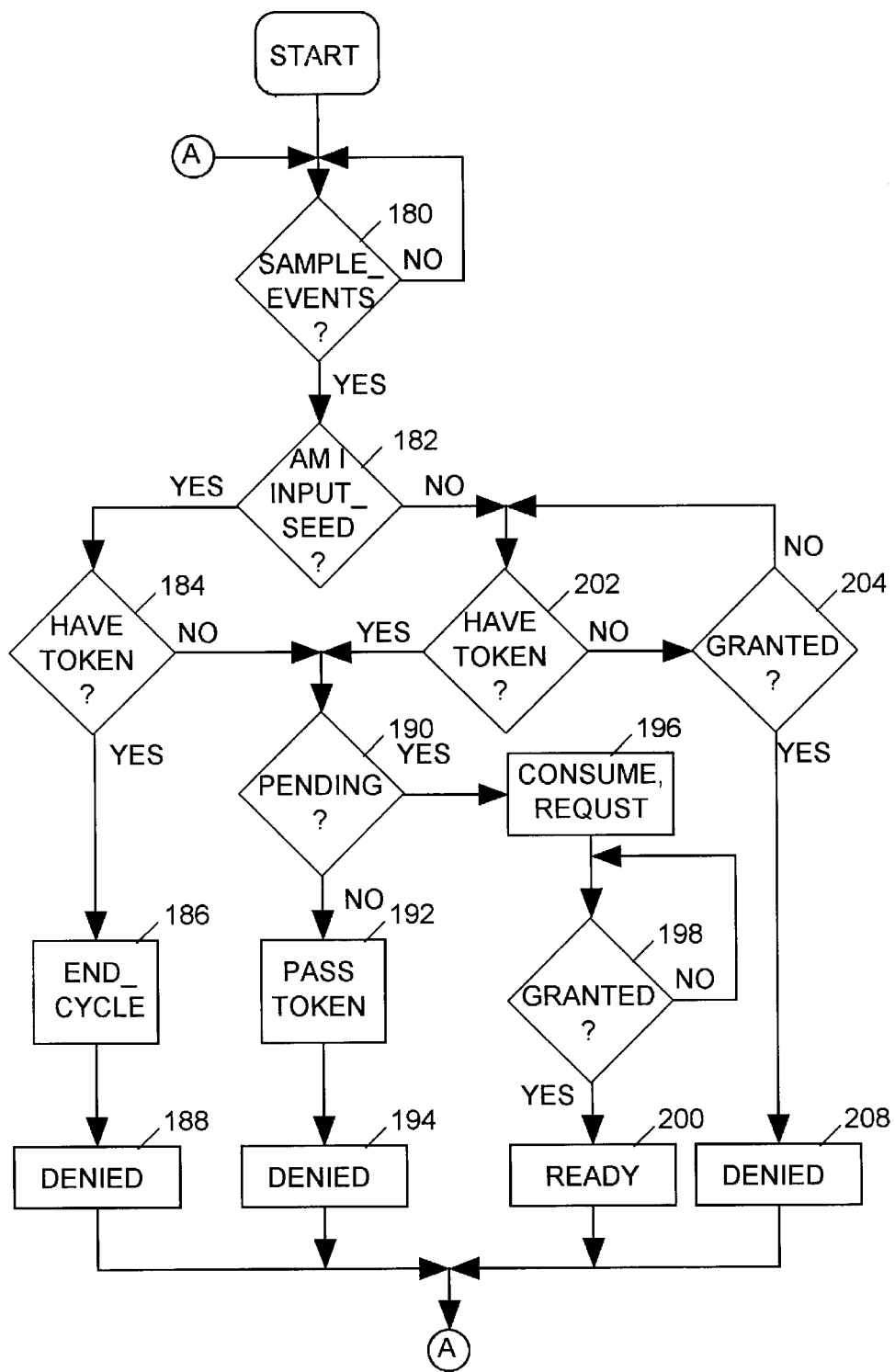

FIG. 1 illustrates a local area network (LAN) switch 10 in accordance with the present invention, FIG. 2 illustrates the input buffer of a port of FIG. 1 in more detailed block diagram form, FIG. 3 is a flow chart illustrating operation of state machine 42 of FIG. 2, FIG. 4 illustrates the output buffer 18 of port P0 of FIG. 1 in more detailed block diagram form, FIG. 5 illustrates routing system 12 of FIG. 1 in more detailed block diagram form, FIG. 6 illustrates arbitrator 92 of FIG. 5 in more detailed block diagram form, FIG. 7 is a flow chart illustrating operation of state machine 100 of FIG. 6, FIG. 8 illustrates output AIU TA0 of FIG. 5 in more detailed block diagram form, FIG. 9 is a flow chart illustrating operation of state machine 127 of FIG. 8, FIG. 10 illustrates an input AIU RA0 of FIG. 5 in more detailed block diagram form, FIG. 11 is a flow chart illustrating operation of state machine 170, and FIG. 12 is a flow chart illustrating operation of response state machine 178 of FIG. 10.

DESCRIPTION OF THE PREFERRED EMBODIMENT(S)

Switch Architecture

FIG. 1 illustrates a local area network (LAN) switch 10 in accordance with the present invention for routing data transmissions (such as for example Ethernet packets or ATM cells) between a set of 16 buses BUS0–BUS15. Each bus BUS0–BUS15 may be either a bi-directional bus for carrying data transmissions both to and away from switch 10 or may be two uni-directional buses—an input bus for carrying data transmissions to switch 10 and an output bus for carrying data transmissions away from switch 10.

Switch 10 includes a routing system 12, an address translation system 13, and a set of sixteen input/output ports P0–P15. Each port P0–P15 receives data transmissions from and forwards data transmissions to a separate network station via a corresponding one of buses BUS0–BUS15. Routing system 12 selectively routes data transmissions between ports P0–P15. Address translation system 13 provides routing information needed for establishing data routing paths through routing system 12. Each port P0–P15 includes a conventional bus interface circuit 14, an input buffer 16 and an output buffer 18. As an incoming data transmission arrives at a port via one of buses BUS0–BUS15, the bus interface circuit 14 of the receiving port forwards that data transmission, one byte at a time, to the port's input buffer 16.

Each data transmission includes addressing data indicating a network destination for the data transmission. As it receives each byte of a data transmission, input buffer 16 stores them in an internal memory. When it has received all bytes of the addressing data included in the data transmission, input buffer 16 sends the addressing data to address translation system 13. Address translation system 13 then returns a unique ID of the particular port P0–P15 that is to forward the data transmission to its network destination. For example when input buffer 16 of port P1 receives a data transmission destined for a network station accessed via bus BUS15 connected to port P15, address translation system 13 will return the ID of port P15 to input buffer 16 of port P1 after port P1 sends the address information to address translation system 13. The input buffer 16 retains the returned port ID for later use when it has fully received and stored the incoming data transmission and is ready to forward it to its destination port P15.

The input buffer 16 of each port P0–P15 is connected to routing system 12 via a corresponding one of a set of 8-bit parallel "vertical" buses V0–V15. The output buffer 18 of each port is connected to routing system 12 via a corresponding one of a set of 8-bit parallel "horizontal" buses H0–H15. Routing system 12 may connect any vertical bus V0–V15 to any horizontal bus H0–H15, thereby establishing a one byte wide data path between the input buffer 16 of any one port to the output buffer 18 of any other port. Many such paths may be established concurrently, but an input buffer may be connected to no more than one output buffer and an output buffer may be connected to no more than one input buffer at any given time.

When an input buffer 16 of one of ports P0–P16 is currently storing one or more data transmissions but is not currently forwarding a data transmission to another port, it requests routing system 12 to provide a routing path to the output buffer 18 of another one of ports P0–P16 that is to forward the data transmission output on a corresponding bus BUS0–BUS15. Routing system 12 establishes a data routing path simply by interconnecting the appropriate pair of horizontal and vertical buses. When input buffer 16 of port P1 requests and is granted a data path to the output buffer 18 of port P15, that input buffer forwards the data transmission to the output buffer one byte at a time via interconnected buses V1 and H15. The receiving output buffer 18 of port P15 stores each byte of the forwarded data transmission in an internal buffer memory as it arrives.

The input buffer 16 of each port P0–P15 asserts a corresponding control signal C0–C15 when it is transmitting data to the output port. The output buffer 18 of each port P0–P15 has a corresponding input line CT0–CT15 conveying a signal indicating when the output buffer is receiving a data transmission. When, for example, routing system 12 connects vertical buses V1 to horizontal bus H15 so that it can convey a data transmission from port P1 to port P15, it also connects the C1 output signal of the input buffer 16 of port P1 to the CT15 input line of the output buffer 18 of port P15. When input buffer 16 of port P1 begins to forward a data transmission to output buffer 18 of port P15, it drives the C1 signal low to tell the output buffer that the transmission has begun. At the end of the data transmission the input buffer 16 drives the C1 signal high to tell the receiving output buffer 18 that the transmission is complete.

The output buffer 18 of each port P0–P15 includes an internal buffer memory for storing each data transmission arriving on the corresponding horizontal bus H0–H15 until it can forward the transmission outward on the corresponding bus BUS0–BUS15. When its buffer memory is full, the output buffer 18 of any port P0–P15 transmits a corresponding "stall" signal (STALL0–STALL15) to routing system 12. The input buffer 16 of each port P0–P15 incudes a two-bit "response" data input (RESP0–RESP15) from routing system 12 that it uses to send codes to the input buffer. When the buffer memory of an output buffer 18 of one port P0–P15 is full and cannot accept any more data from an input buffer 16 of another port that is sending it data, that output buffer asserts its corresponding STALL signal. Routing system 12 then sends a "FULL" response code to the input buffer 16 to tell it to stop sending data. When the output buffer 18 thereafter frees some buffer memory space by forwarding stored data outward from switch 10 it de-asserts its STALL signal output. Routing system 12 responds by setting the response code input to the sending input buffer 16 to a "READY" response code to tell it that it may resume sending data to the output buffer 18.

The input buffer 16 of each port P0–P15 also uses the corresponding output bus V0–V15 to send routing requests to routing system 12. The input buffer 16 of each port P0–P15 sends its corresponding control signal C0–C15 to routing system during each cycle of a system clock signal to indicate whether the byte on corresponding bus V0–V15 is a routing request or a byte of a data transmission. When the control signal C0–C15 is high, a command is being sent via the corresponding bus V0–V15, and when the control signal C0–C15 is low, a data byte is being sent. An input buffer may send two types of commands, REQUEST or NOOP. A REQUEST command is a request for a data routing path through routing system 12 and includes the ID of the port P0–P15 to which the data routing path is being requested. Each input buffer 16 sends a NOOP command to routing system 12 during any system clock cycle in which it is not currently forwarding a data transmission data byte to an output buffer and is not ready to send a routing request.

Routing system 12 sends separate two-bit response data RESP0–RESP15 to each input buffer 16 of each port P0–P15. The response data conveys any one of four codes. A "WAITING" code indicates that routing system 12 is either waiting to receive a routing request from the input buffer 16 or is waiting to respond to a previously sent routing request. A "DENIED" code indicates that routing system 12 has denied the input buffer's last routing request. A "READY" code indicates that the receiving input buffer 16 is currently connected to an output buffer 18 and that the output buffer is ready to receive a next byte of a data transmission. A "FULL" code indicates that the receiving input buffer 16 is currently connected to an output buffer 16 but the output buffer is full and not ready to receive another data transmission byte.

In accordance with the invention, routing system 12 also provides STATUS data to the input buffer 16 of each port P0–P15. The STATUS data indicates whether the output buffer 18 of each port P0–P15 is currently "idle" or "busy". An output buffer is considered idle if it is ready to receive a data transmission. An output buffer 18 is considered "busy" if it is currently receiving a data transmission or if it is has a full data buffer. The input buffers use the STATUS data when deciding whether to request a connection to an output buffer.

When the input buffer 16 of, for example, port P1 does not have a complete data transmission stored in its buffer memory and is not currently forwarding data transmission data through routing system 12, it places the NOOP code on the V1 bus and continues to hold the C0 line high for each system clock cycle. When that input buffer 16 of port P1 thereafter receives and stores an incoming data transmission destined, for example, to port P15, it checks the STATUS data to determine whether the output buffer 18 of port P15 is idle. If so, input buffer 16 places a REQUEST code on bus V1 including the ID of port P15 and holds it there. The REQUEST code acts as a routing request allowing input buffer 16 of port P1 to compete with input buffers 16 of one or more other ports P0–P15 that may also be currently requesting a data routing path to output buffer 18 of port P15.

When routing system 12 thereafter determines which input buffer 16 wins the data routing path to port P15, it establishes the requested routing path, sets the STATUS data to indicate output buffer 18 of port P15 is busy, sends a READY response code on the particular response lines (RESP0–RESP15) to the winning input buffer 16, and sends a DENIED response code on the response lines to all other input buffers.

After sending the REQUEST command, input buffer 16 of port P1 monitors the RESP1 data to determine whether it receives a READY or DENIED code. If it receives the DENIED request, it withdraws its request for port P15. If it receives a READY code, input buffer 16 of port P1 drives its output C1 control signal low and places each successive byte of the data transmission on the V0 line during each cycle of the system clock, provided the RESP1 data continues to convey the READY code. It halts data transmission during any system clock cycle in which the RESP data conveys the FULL code. After forwarding the last byte of the data transmission, the input buffer 16 places the NOOP command on the V1 bus and drives the C1 signal high again. This tells routing system 12 that the data transmission is complete and that output buffer 18 of port P15 is idle once again.

It may happen that when input buffer 16 of port P1 has received and stored the data transmission destined for port P15, it finds that the STATUS data indicates port P15 is currently busy. In that case, input buffer 16 refrains from sending a routing request to routing system 16 for a data path to port P15 until such time as the STATUS data indicates that port P15 has become idle once again. In the meantime, input buffer 16 of port Pi may receive a subsequent data transmission that is to be forwarded, for example, to port P0. If the STATUS data continues to indicate that the output buffer 18 of port P15 is still busy but that the output buffer 18 of port P0 is idle, then port P1 will request a data routing path to port P0 and forward the later-arriving data transmission to port P0 if routing system 12 grants the request. In general, the input buffer 16 of each port P0–P15, when storing more than one data transmission, will request a data routing path to forward its longest-stored data transmission, provided that it is destined for an idle output buffer. If that output buffer is busy, the input buffer may request a routing for a subsequently received data transmission if destined to an idle output buffer. Thus even though the destination output buffer for its longest-stored data transmission is busy, an input buffer 16 is not blocked from forwarding more recently received data transmissions to their destination output buffers if those output buffers are idle.

Bus interface circuit 14, output buffer 18 and address translation system 13 are conventional and are not further detailed herein. Input buffer 16 and routing system 12 are described in detail below.

Input Buffer Architecture

FIG. 2 illustrates input buffer 16 of port P0 of FIG. 1 in more detailed block diagram form. Input buffers 16 of ports P1–P15 are similar. Referring to FIGS. 1 and 2, each successive byte of a data transmission from the bus interface circuit 14 is loaded into a shift register 28 via an 8-bit bus 30 in response to a LOAD signal asserted by the bus interface circuit. A buffer controller 32 counts pulses of the LOAD signal to determine when the data transmission data bytes containing the network source and destination addresses are currently stored in shift register 28. At that point, buffer controller 32 sends a TRANSLATE signal to an address translation unit 34 which reads the addresses out of shift register 28 and forwards them via bus 20 to address translation system 13 of FIG. 1. When the address translation system thereafter returns the port ID of the port P1–P15 to which the incoming data transmission is destined, translation unit 34 forwards the port ID to a register file 36 and pulses a TRANS_READY signal input to buffer controller 32. Buffer controller 32 responds by addressing and write enabling one of the registers of register file 36 so that it stores the destination port ID.

In the meantime, the LOAD signal also shifts each arriving byte of the data transmission data into a FIFO buffer 38. When buffer 38 signals that it is not empty, buffer controller shifts each byte out of buffer 38 and into a dynamic random access memory (DRAM) 40. Bus interface circuit sends an END signal to buffer controller 32 to indicate when it has shifted the last byte of a data transmission into buffer 38. On receipt of a next LOAD signal pulse after receiving the END signal pulse, buffer controller 32 assumes that a new data transmission is arriving from the bus interface circuit.

Buffer controller 32 divides the address space of DRAM 40 into a set of data buffers, each data buffer including a sufficient amount of memory to store the largest possible data transmission. Buffer controller 32 stores each incoming data transmission in a separate data buffer until it can be routed to another switch port. The data transmissions stored in DRAM 40 form a "data transmission queue". The longer a data transmission remains stored in DRAM 40, the closer to the front of the queue it becomes. Buffer controller 32 keeps track of the order in which data transmissions appear in the queue. Register file 36 includes a separate addressable register for each data buffer for storing the destination port ID for the data transmission stored in the corresponding data buffer.

A state machine 42 handles arbitration protocol for input buffer 16. When no data transmissions are currently stored in DRAM 40, buffer controller 32 sets an EMPTY signal input to state machine 42 true. When at least one data transmission is currently stored in DRAM 40, buffer controller 32 sets the EMPTY signal false. A multiplexer 44 controlled by an input SEL signal from state machine 42 may place on the V0 bus to output to routing system 12 of FIG. 1 either a data transmission byte read out of DRAM 40, a port ID read out of register file 36 (as a connection request), or a "no operation" (NOOP) code.

Input buffer 16 also includes a "status" register 46 for receiving and storing the STATUS data on each pulse of the system CLOCK signal and a multiplexer 48 controlled by a port ID read out of register file 36 for selecting one bit of the STATUS data as a PORT_BUSY signal input to state machine 42. A "status checked" register file 50, addressed by the PORTID output of register file 36, includes a set of 16 addressable registers, one for each output port P0–P15, each storing a single bit. The bit stored in the currently addressed register is provided as a CHECKED signal input to state machine 42. When state machine 42 asserts an output SET_BIT signal, the bit in the currently addressed register of register file 50 is set true. When state machine 42 asserts a RESET_ALL signal, the bit in each of the 16 registers 36 is set false.

Request Protocol

FIG. 3 is a flow chart illustrating operation of state machine 42 of FIG. 2. Referring to FIGS. 2 and 3, on the first pulse of a system clock signal (CLOCK) after receiving a system reset signal (RESET), state machine 42 sets multiplexer 44 to place the NOOP code on the V0 bus, drives the C0 signal high, and pulses a RESET_ALL signal input to register file 50 (step 60). The RESET_ALL signal pulse sets every bit in register file 50 to a logical "0". State machine then waits (step 62) until EMPTY signal is false, indicating that at least one data transmission is stored in DRAM 40. At that point state machine 42 pulses a FIRST signal input to buffer controller 32 (step 64). Buffer controller 32 responds by read addressing register file 36 so that it produces the destination port ID (PORTID) for the longest-stored data transmission in DRAM 40, the data transmission at the front of the buffer queue. The PORTID data causes multiplexer 48 to deliver a bit of the STATUS data stored in register 46 as the PORT_BUSY signal. The PORT_BUSY signal thus indicates whether the data transmission's destination port is busy or idle. The PORTID also selects a bit stored in register file 50 as the CHECKED bit input to state machine 42. The CHECKED bit, if true, indicates whether state machine 42 as previously checked that destination port's STATUS bit.

State machine 42 next determines whether either the BUSY bit or the CHECKED bit is true (step 66). Initially the CHECKED bit is false. If the BUSY bit is true, then destination port for the first data transmission of the queue is busy. This tells state machine 42 that it should not send a request for a data routing path to that port. In such case, state machine 42 pulses the SET_BIT signal to set the bit in the currently addresses status register 50 true (step 68) to indicate that it has now checked the status of the destination port and has determined that it is busy. State machine 42 then checks whether buffer controller 32 is currently asserting an output LAST_PACKET signal (step 70). The LAST_PACKET signal indicates whether the currently selected data transmission is the last data transmission of the queue. If the LAST_PACKET signal is true (step 70), state machine 42 returns to step 60. However if LAST_PACKET signal is false (step 70), state machine 42 pulses a NEXT signal input to buffer controller 32 (step 72) telling it to select the next data transmission of the queue by appropriately adjusting the read address input to register file 36.

The new PORTID value will differ from the previous PORTID value if that next data transmission in the queue is not destined for the same switch port as the first data transmission of the queue. If the second data transmission is destined for the same port as the first data transmission, the CHECKED bit will have been set. It may be that destination port has in the meantime become idle and that the BUSY bit will now be false. However since the CHECKED bit is set, state machine 42 continues (at step 66) to assume that the destination port is busy. It does this because it wants to forward data transmissions to any given port in the order input buffer received them. If a destination port for one data transmission of the queue is busy when that data transmission is selected, the input buffer should not send a subsequent data transmission of the queue to that destination port to that same destination port if the destination port happens to become idle when the subsequent data transmission is selected. Thus if either the CHECKED bit or the BUSY bit is set at step 66, state machine 42 assumes that the destination port for the currently selected port is busy and moves on to steps 68 and 70.

State machine 42 continues to loop steps 66, 68 and 70 until if determines that the last data transmission of the queue is selected (step 70) or until it determines that a data transmission destined for an idle port (step 66). If it reaches the last data transmission in the queue without finding an idle destination port, state machine 42 returns to step 60 to start the process over again with the first data transmission of the queue.

If it finds an idle destination port at step 66, state machine 42 initiates a routing request. First it switches multiplier 44 to place a routing request (REQUEST) on the VO bus (step 74). The REQUEST is actually the port ID (PORTID) of the currently selected data transmission appearing at the output of register file 36. State machine 42 then checks the code conveyed by the response data input (RESPO) from the routing system (step 76). As long as it detects a WAITING code, state machine 42 continues to loop through step 76 on each pulse of the system CLOCK signal. If on any CLOCK cycle it detects the DENIED code, state machine 42 returns to step 60. However if at step 76 it detects the READY response code, state machine 42 pulses a SEND_BYTE signal input to buffer controller 32 to tell it to read address DRAM 40 so that it reads out a first byte of the select data transmission. State machine 42 also signals multiplier 44 to place that data transmission byte on the V0 bus, and sets the C0 signal low to indicate that it is now sending a data transmission via the V0 bus (step 78). Buffer controller 32 asserts a LAST_BYTE signal input to state machine 42 when the byte last forwarded out of DRAM 40 is the last byte of the selected data transmission. If the LAST_BYTE signal is not asserted (step 80), state machine 42 sends the RESP0 data to determine if it is currently conveying the FULL code indicating the output buffer of the destination port is currently full (step 82). If so, state machine 42 sets the SEND_BYTE signal low so that buffer controller 32 does not increment the current DRAM 40 address (step 84). However if the RESP0 data conveys a READY code, state machine 42 sets the SEND_BYTE signal high to tell buffer controller to increment the DRAM 40 address (step 86), thereby forwarding a next byte of the selected data transmission via bus VO. State machine 42 continues to loop through steps 80–86 until at step 80 buffer controller 32 asserts the LAST_BYTE signal. At that point state machine 42 returns to step 60 to start the process over. When it drives the C0 signal high at step 60, routing systems 12 determines that the destination port is no longer busy and sets its corresponding STATUS bit accordingly.

Output Buffer Architecture

FIG. 4 illustrates the output buffer 18 of port P0 of FIG. 1 in more detailed block diagram form. Output buffers 18 of ports P1–P15 are similar. Referring to FIG. 4, a data transmission byte arrives on bus H0 from routing system 12 on each pulse of the system CLOCK signal whenever the CT0 signal is low. This tells a logic circuit 85 to send a SHIFT_IN signal to a FIFO buffer 87. If FIFO buffer 87 is not full it will respond to the SHIFT_IN signal by storing the data transmission byte and a bit indicating the state of the CT0 signal. If FIFO buffer 87 is full it will assert the STALL0 signal. An asserted STALL0 signal prevents logic circuit 85 from shifting data into FIFO buffer 87. When the CT0 signal goes high, indicating that a complete data transmission has been shifted into FIFO buffer 87, logic circuit 85 sends an INC signal pulse to increment the count of a counter 88 and also pulses the SHIFT_IN signal one more time to load the high CT0 bit into FIFO buffer 87. When the count of data 1 transmission counter 88 is greater than 0, indicating that at least one full data transmission is stored in FIFO buffer 87, bus interface circuit 14 of port P0 FIG. 1 pulses a SHIFT_OUT signal so shift a next data transmission byte output of FIFO buffer 87. The bus interface circuit then forwards the byte outward on BUS0. FIFO buffer 87 also shifts out the CT0 bit stored with each data transmission byte as an "end of data transmission" signal EOP. When the EOP signal is low, the bus interface circuit treats the shifted out data transmission byte as valid. After the last byte of a data transmission is shifted out of FIFO buffer 87, the EOP signal goes high when the bus interface circuit attempts to shift out another data transmission byte. This tells the bus interface circuit that the previous byte was the last data transmission byte and that the current FIFO buffer 87 output data transmission byte is invalid. The rising edge of the EOP signal decrements the count maintained by data transmission counter 88. If its count remains greater than zero, the counter 88 continues to assert the PACKET_READY signal to tell the bus interface circuit that it may begin shifting out bytes of a next data transmission.

Routing System Architecture

FIG. 5 illustrates routing system 12 of FIG. 1 in more detailed block diagram form. Routing system 12 includes a routing switch 90 controlled by routing control data (CONTROL) from an arbitrator 92. The CONTROL data input to routing switch 90 includes a port ID of an "input port"—one of ports P0–P15 of FIG. 1 having an input buffer 16 requesting a data routing path to the output buffer 18 of another one of ports P0–P15. The CONTROL data also includes the ID of an "output port"—the particular one of ports P0–P15 to which a data routing path is being requested. When routing switch 90 receives CONTROL data, it connects the particular "horizontal" bus H0–H15 leading to the requested output port to the particular "vertical" bus V0–V15 leading from the requesting input port. The CONTROL data also tells routing switch 90 to disconnects the requested output port from any other input port it to which it may currently be connected. A suitable routing switch 90 is generally similar to that described in U.S. Pat. No. 5,689,664 entitled "Network Switch With Arbitration System", issued Nov. 18, 1997 to Chou et al and incorporated herein by reference.

Routing system 12 includes a set of output arbitration interface units (AIU's) TA0–TA15. Each output AIU TA0–TA15 receives the STALL0–STALL15 signals output of a corresponding port P0–P15 and one of a set of signals CT0–CT15 indicating whether the corresponding port is busy. Each output AIU TA0–TA15 asserts a corresponding bit STATUS0–STATUS15 of the STATUS data when its corresponding port is either busy or full. Routing system 12 also includes a set of input AIU's RA0–RA15. Each input AIU RA0–RA15, receives the control signal C0–C15 from a corresponding one of ports P0–P15 indicating whether the port is making a routing request. Each input AIU RA0–RA15 also receives a corresponding one of a set of input signal ST0–ST15 indicating the stall status of any output port to which the corresponding input port P0–P15 may be currently connected. Routing switch 90 also cross-connects the STALL0–STALL15 signals to the ST0–ST15 signal inputs of AIU's RA0–RA15 and cross-connects the C0–C15 signals to the CT0–CT15 signal input of output AIU's TA0–T15. For example, when routing switch 90 connects vertical bus V1 from port P1 to horizontal bus H15 from port P15, it also connects the C1 signal output of port P1 to the CT15 signal input of output AIU TA15 and connects the STALL15 output of port P15 to the ST1 input to input AIU RA1. All input AIU's RA0–RA15 are connected in a series loop by lines 94 to form an "input token passing ring" 96 . All output AIU's TA0–TA15 are connected in a loop by lines 97 to form an output token passing ring 98. Input AIU's RA0–RA15 and output AIU's TA0–TA15 all communicate with arbitrator 92 through a "global" bus (GLOBAL).

To start an arbitration cycle, arbitrator 92 sends an "output seed" via the GLOBAL to all output AIU's TA0–TA15. The output seed is the ID of one ports P0–P15 that arbitrator 92 has chosen as an "output seed port". The output AIU corresponding to the output seed port determines from its input signals whether its corresponding port P0–P15 is idle and not full. If the port is busy or full, it passes an "output token" to the next output AIU of output token passing ring 98 by sending a signal to the next output AIU via a line 97. If the output AIU receiving the output token determines that its corresponding port is busy or full, it forwards the output token to the next AIU of output token passing ring 98. When the output token arrives at one of output AIU's TA0–TA15 for which the output buffer of the corresponding port P0–P15 is idle and not full, that idle port becomes the "winning output port". The AIU sends the ID of the winning output port to arbitrator 92 and to all input AIU's RA0–RA15 via the GLOBAL bus.

The winning output port's AIU also sends an "input seed" to all input AIU's RA0–RA15 selecting another of ports P0–P15 as an "input seed port". The input AIU corresponding to the input seed port then starts an input token passing cycle. When the input token arrives at one of input AIU's RA0–RA15 for which a pending request for the winning output port appears on the corresponding bus V0–V15, the requesting input port becomes the "winning input port". The input AIU for the winning input port then sends the ID of the winning input port to arbitrator 92. Arbitrator 92, having received the port ID's of the winning input and output ports, then transmits CONTROL data to routing switch 90 establishing a data routing path between the winning input and output ports. Arbitrator 92 then signals all input arbitrators RA0–RA15. The input AIU for the winning input port then sends a READY response code to the input buffer of the winning input port telling it to begin forwarding a data transmission to the winning output port. Each other input AIU currently receiving a pending request on its corresponding one of buses V0–V15 sends a DENIED response code to the input buffer of its corresponding one of ports P0–P16. On the next CLOCK cycle thereafter, each input AIU that sent a DENIED response code, sends a WAITING response code to their corresponding port telling it that it may transmit another routing request.

When a data routing path is established, for example between buses V1 and H15, P1 acting as the input port begins transmitting a data transmission data byte during each system CLOCK cycle to port P15 acting as the output port. The STALL15 signal output of port P15 is also connected to the ST1 input to input AIU RA1 via routing switch 90. Whenever the output buffer 18 of port P15 becomes full, it asserts the STALL15 signal, thereby asserting the ST1 signal input to AIU RA1. Input AIU RA1 responds to assertion of its ST1 input signal by changing the code conveyed by the RESP1 data from READY to FULL, thereby telling port P1 to stop forwarding data transmission data bytes. When port P15 subsequently deasserts the STALL15 signal, thereby deasserting the ST1 signal, input AIU RA1 changes the RESP1 data code back to READY to signal port P1 to resume forwarding data transmission data.

On the next system CLOCK cycle after port P1 sends the last byte of the data transmission data, it deasserts its C1 output signal. Since routing switch 90 delivers the C1 signal as the CT15 input to port P15 and output AIU TA15, de-assertion of the C1/CT15 signals tells the output buffer 18 of port P15 and output AIU TA15 that the transmission is complete. Thereafter AIU TA15 considers port P15 to be idle and may compete for a data routing path during a next output token passing cycle.

Global Bus

The global bus of FIG. 5 interconnecting arbitrator 92 with the input and output AIU's includes 22 lines conveying eight data values or control signals as illustrated in Table I.

TABLE I

| DATA/SIGNAL | LINES | PURPOSE |
| --- | --- | --- |
| CLOCK | 1 | System clock |
| INPUT_SEED | 4 | Input seed ID |
| OUTPUT_SEED | 4 | Output seed ID |
| INPUT_PORT | 4 | Input token holder ID |
| OUTPUT_PORT | 4 | Output token holder ID |
| REQUEST | 1 | Request a data routing path |
| SAMPLE_EVENTS | 1 | Start taken passing cycle |
| GRANTED | 1 | Grant routing request |

TABLE I-continued

| DATA/SIGNAL | LINES | PURPOSE |
| --- | --- | --- |
| OUTPUT_EOC | 1 | End output token passing cycle |
| INPUT_EOC | 1 | End input token passing cycle |

Arbitrator

FIG. 6 illustrates arbitrator 92 of FIG. 5 in more detailed block diagram form. Arbitrator 92 includes a state machine 100 for sequencing device operations, an output seed generator 102 containing a rotating table of output port IDs for placing one of the output port IDs on the OUTPUT_SEED lines of the GLOBAL bus.

FIG. 7 is a flow chart illustrating operation of state machine 100 of FIG. 6. Referring to FIGS. 6 and 7, to start an output token passing cycle, state machine 100 pulses a NEXT signal (step 104) telling seed generator 102 to select a next one of the output port IDs from its rotating table and place it on the OUTPUT_SEED lines. State machine 100 then pulses the SAMPLE_EVENTS line of the GLOBAL bus (step 106) to tell the AIU for the output seed port that a token passing cycle has begun. State machine 100 then begins to check for an asserted REQUEST signal (step 110) or an asserted OUTPUT_EOC signal (step 108). During the token passing cycle, the output AIU of a winning output port and an output AIU of a winning input port (if any) place their port's IDs on the OUTPORT_PORT and INPUT_PORT lines. The winning INPUT_PORT and OUTPUT_PORT data appearing on the GLOBAL bus are delivered by the CONTROL bus to routing switch 90. When the input AIU for the winning input port thereafter asserts the REQUEST signal line (step 108), state machine 100 pulses a WRITE line of the CONTROL bus input to routing switch 90 of FIG. 5 (step 112). This causes routing switch 90 to establish a data routing path between the winning input port and the winning output port and to break any pre-existing data routing path to the winning output port. Thereafter state machine 100 pulses the GRANTED signal (step 114) to tell the AIU for the winning input port that the data routing path has been made and to tell AIU for the winning output port that it may pass the output token. State machine 100 then continues to loop through steps 108 and 110 until it detects another assertion of the REQUEST signal or assertion of the OUTPUT_EOC signal.

The output AIU for the output seed port asserts the OUTPUT_EOC signal at the end of an output token passing cycle when it receives the output token. After detecting an asserted OUTPUT_EOC signal at step 110, state machine 100 pulses the granted signal (step 118) and then returns to step 104 to start another output token passing cycle.

Output Arbitration Interface Unit

FIG. 8 illustrates output AIU TA0 of FIG. 5 in more detailed block diagram form. Output AIU TA0 includes an arbitration control state machine 127 clocked by the system CLOCK signal, a set of three tri-state buffers 130–132, a comparator 134 and an input seed generator circuit 136. Comparator 134 asserts its output signal when an output port ID appearing on the OUTPUT_SEED lines of the GLOBAL bus matches MY_ID, the ID of output port TP0. The CT0 input to AIU TA0 drives its STATUS0 output.

FIG. 9 is a flow chart illustrating operation of state machine 127 of FIG. 8. Referring to FIGS. 8 and 9, on system power up, state machine 127 initializes itself (step 140). During step 140, state machine 127 de-asserts its OUTPUT_TOKEN signal supplied to the next output AIU. State machine 127 also sets three output signals END_

CYCLE, CONSUME and SEED to turn off the three tri-state buffers 130–132. State machine 127 then awaits a pulse on the SAMPLE_EVENTS line (step 142).

To start a token passing cycle, arbitrator 92 (FIG. 5) places the ID of one of the output ports on the OUTPUT_SEED lines and then signals the start of the output token passing cycle by pulsing the SAMPLE_EVENTS line. On detecting the SAMPLE_EVENTS pulse, state machine 127 determines whether its output port is the output seed by looking at the output of comparator 134 (step 144). As shown in FIG. 8, comparator 134 compares the output port's ID (MY_ID) with the port ID conveyed on the OUTPUT_SEED lines and signals state machine 127 with the comparison result. If output port TP0 is not the output seed, then state machine 127 waits (step 146) until it has received the output token (i.e. until its input OUTPUT_TOKEN signal is asserted) and then moves to step 148. Otherwise if output port TP0 is the output seed and has not yet received the output token (step 147), state machine 127 moves directly to step 148.

At step 148 state machine 127 checks its CT0 input signal to determine whether its output port TP0 is idle. If port TP0 is not idle, state machine 127 passes the output token to the next output port (step 149). If port TP0 is idle at step 148, state machine 127 pulses a NEXT signal input to seed generator 136 and sets its CONSUME and SEED output signals to turn on tri-state buffers 131 and 132 of FIG. 8 (step 150). When tri-state buffer 131 turns on, it places the ID of output port TP0 (MY_ID) on the OUTPUT_PORT lines. Seed generator 136 contains a rotating table of input port IDs and supplies one of the input port IDs as input to buffer 132. A pulse of the NEXT signal tells seed generator 136 to select a next one of the input port IDs from its rotating table as its output. When tri-state buffer 132 turns on it places the output of SEED generator 136, the ID of one of ports P1–P15, on the INPUT_SEED lines. When a valid ID appears on the INPUT_SEED lines, the input AIUs RA0–RA15 arbitrate for a data routing path to the output port (TP0) whose ID appears on the OUTPUT_PORT lines. If an input AIU having a pending routing request for output port TP0 wins the arbitration, it places its input port ID on the INPUT_PORT lines and asserts the REQUEST signal line. If no input AIU has a pending request for output port TP0, the seed input port asserts the INPUT_EOC signal of the GLOBAL bus.

After initiating an input token passing cycle at step 150, state machine 127 cycles through steps 152 and 154 looking for assertion of either the INPUT_EOC signal (step 152) or the REQUEST signal (step 154). State machine 127 then waits for assertion of the GRANTED signal (step 158). Central arbitrator 92 of FIG. 5 asserts the GRANTED signal when it has established the data routing path between input and output ports. After the data routing path has been granted, state machine 127 passes the output token to the next output port (step 160).

After passing the output token at steps 149 or 160, state machine 127 again checks whether port TP0 is the output seed (step 162). If not, state machine 127 waits until the output seed assets the OUTPUT_EOC signal (step 164) to mark the end of the output token passing cycle. At that point state machine 127 re-initializes the output arbitrator (step 140) and then waits (step 142) for a SAMPLE_EVENTS pulse signaling the start of another output token passing cycle.

If state machine 127 determines at either step 144 or 162 that port P00 is the output seed, it reverts to step 147 where it checks whether it has the output token (step 147). If the output seed has received the token, the output token passing cycle has ended, all output AIUs having received and passed the output token. Thus state machine 127 asserts the OUTPUT_EOC signal (step 166) to signal the end of the output token passing cycle. State machine 127 then waits (step 168) until the central AIU 22 (FIG. 5) responds to the OUTPUT_EOC code by pulsing the GRANTED signal. State machine 22 then returns to step 140 to re-initialize the output AIU and thereafter awaits the start of another output token passing cycle (step 142).

Input Arbitration Interface Unit

FIG. 10 illustrates an input AIU RA0 of FIG. 5 in more detailed block diagram form. Input AIUs RA1–RA15 are similar. Input AIU RA0 includes a state machine 170 clocked by the system CLOCK signal for sequencing arbitration operations. A comparator 172 compares the port ID conveyed on the V0 input line from port P0 to the port ID conveyed on the OUTPUT_PORT lines of the GLOBAL bus and asserts an input to an AND gate 173 when they match. AND gate 173 ANDs the output of comparator 172 with the C0 signal from port P0 and asserts a PENDING signal input to state machine 170 when port P0 has a pending request for the port whose ID appears on the OUTPUT_PORT lines. A comparator 174 signals state machine 170 when the port ID conveyed on the INPUT_SEED lines matches the ID of port P0 (MY ID). State machine 170 may turn on a tristate buffer 176 to place the ID of port P0 (MY ID) on the INPUT_PORT lines of the GLOBAL bus. A tristate buffer 177 asserts the INPUT_EOC line in response to an END_CYCLE signal form state machine 170. A response control state machine 178 produces the RESP0 data input to port P0 in response to the ST0 and C0 signals and a pair of signals (READY, and DENIED) from arbitration control state machine 170.

FIG. 11 is a flow chart illustrating operation of state machine 170. Referring to FIGS. 10 and 11, following system power up, state machine 170 waits (step 180) until it detects an asserted SAMPLE_EVENTS signal, indicating the start of a token passing cycle. State machine 170 then checks the output of comparator 174 to determine if port P0 is the input seed (step 182). If port P0 is the input seed but the input token passing cycle is at an end, the INPUT_TOKEN input to state machine 170 will be asserted and state machine 170 will "have the token". If state machine 170 has the token (step 184) it asserts the END_CYCLE signal to send an INPUT_EOC signal outward on the GLOBAL bus to indicate that the input token passing cycle has come to an end (step 186). State machine 170 then pulses the DENIED signal input to state machine 178 (step 194) and then returns to step 180.

If at step 184 the input token passing cycle just begun, state machine 170 will not have the input token. It will therefore check its PENDING signal input to determine if port P0 has a pending request for the output buffer whose ID appears on the OUTPUT_PORT lines (step 190). If input port P0 does not have a pending request for the output buffer, state machine 170 passes the input token (step 192) by asserting its output INPUT_TOKEN signal. It then pulses the DENIED signal input to state machine 178 and then returns to step 180.

If at step 190 state machine 170 detects that port P0 has a pending request for the port whose ID currently appears on the OUTPUT_PORT lines, state machine 170 will assert the CONSUME signal causing buffer 176 to place the ID or port P0 on the INPUT_PORT lines of the GLOBAL bus and then pulse the REQUEST line of the global bus (step 196). It then waits for assertion of the GRANTED signal (step 198)

indicating that its routing request has been granted. At that point state machine 170 pulses the READY signal (step 200) and then returns to step 180.

If port P0 is not the input seed port (step 182), then state machine 170 determines if it has the input token (step 202). If it does, it moves to step 190 to determine if it has a pending request and proceeds thereafter in the manner described above. If at step 202 state machine 170 does not have the token, it checks whether the GRANTED signal has been asserted (step 204). If the GRANTED signal is not asserted, state machine 170 returns to step 202. If the GRANTED signal is asserted at step 204, state machine 170 pulses the DENIED signal (step 208) and then returns to step 180.

FIG. 12 is a flow chart illustrating operation of response control state machine 178 of FIG. 10. On system start up state machine 187 sets the RESP0 input to port P0 to the WAITING code (step 210). If its READY signal input is not asserted (step 212) and its DENIED signal input is not asserted (step 214), state machine 178 returns to step 210. However if the DENIED signal input is asserted at step 214, state machine 178 sets the RESP0 code to "DENIED" for one CLOCK signal cycle (step 216) and then returns to step 210. If at step 212 its READY signal input is asserted, the STO signal is not asserted (step 218) and its C0 signal input is not asserted (step 220), state machine 178 sets the RESPO code to "READY" (step 222). State machine 178 continues to cycle thorough steps 218 and 220 during each CLOCK signal cycle. If during any CLOCK signal cycle the STO signal is asserted, indicating that the output buffer receiving a data transmission is full, state machine 178 sets the RESP0 code to "FULL" (step 224) and returns to step 218. If during any CLOCK cycle the C0 signal is asserted (step 220) to indicate that the transmission is complete, state machine 178 returns to step 210.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A routing switch for routing data transmissions between a plurality of buses, the routing switch comprising:

a plurality of input buffers;

a plurality of output buffers; and routing means for granting a routing request made by any one of said input buffers by providing a data path for conveying a data transmission between the input buffer making the routing request and an output buffer identified by the routing request, and for sending STATUS data to each input buffer wherein said STATUS data concurrently indicates a status of every one of said output buffers, wherein the status of an output buffer is idle if it is not currently linked to one of said input buffers by a data path provided by said routing means and the status of an output buffer is busy if it is currently linked to one of said input buffers by a data Path provided by said routing means, wherein each input buffer corresponds to a separate one of said buses, receives and stores data transmissions arriving at said routing switch via its corresponding bus, sends a routing request to the routing means the routing request identifying an idle output buffer indicated by said STATUS data as being idle whenever the input buffer is not currently forwarding a data transmission to an output buffer and is currently storing a data transmission to be forwarded by the idle output buffer, and forwards the stored data transmission to the idle output buffer via a data path provided by said routing means when said routing means grants the routing request, and wherein each output buffer corresponds to a separate one of said buses and forwards each data transmission received from any one of said input buffers outward from said routing switch via its corresponding bus.

2. The routing switch in accordance with claim 1 wherein upon granting a routing request from an input buffer said routing means sends a GRANTED response to that input buffer, and wherein upon receiving the GRANTED response, the input buffer forwards a stored data transmission to an output port via a data path provided by said routing means.

3. The routing switch in accordance with claim 2 wherein upon granting a routing request from an input buffer, said routing means also sends a DENIED response to others of said input buffers, and wherein when any of said input buffers receives a DENIED response when it is not busy forwarding a data transmission to an output buffer, the receiving input buffer sends a routing request to the routing system if it is currently storing a data transmission to be forwarded by an output buffer said STATUS data indicates is idle.

4. The routing switch in accordance with claim 3 wherein said routing means comprises:

switching means connected to said input and output buffers for providing routing paths therebetween in accordance with control data provided as input thereto; and an arbitration system connected to said input buffers for receiving routing requests from each of said input buffers and providing said control data input to said switching means in response to said routing requests.

5. The routing switch in accordance with claim 1 wherein each of said output buffers includes memory for storing each data transmission it receives from an input buffer in an internal buffer memory until the output buffer can forward the data transmission via the corresponding bus, wherein each of said output buffer asserts a STALL signal input to said routing means when the output buffer's memory is full and de-asserts the STALL signal when the output buffer's memory is no longer full, wherein when a STALL signal from an output buffer is asserted, said routing means sends a "FULL" code to an input buffer forwarding a data transmission to said output buffer, and when the output buffer thereafter de-asserts the STALL signal, said routing means sends a "READY" code to said input buffer.

wherein upon receiving the FULL code, said input buffer suspends forwarding the data transmission to said output buffer, and wherein upon receiving the READY code, said input buffer resumes forwarding the data transmission to said output buffer.

6. The routing switch in accordance with claim 5 wherein the routing request identifies the output buffer that is to receive a longest-stored data transmission to be received by an output buffer said STATUS data indicates is idle.

7. The routing switch in accordance with claim 5 wherein at least one of said input buffers comprises:

memory means for storing a plurality of data transmissions arriving at said routing switch via one of said buses, means for determining an output buffer that is to receive each data transmission stored in said memory means, and means for determining from said STATUS data whether any output buffer to which any of the data transmissions stored in said memory means is to be forwarded is idle, and for sending a routing request to said routing means when any one of the data transmissions stored in said memory means is to be forwarded by an idle output buffer, wherein said routing request identifies said idle output buffer.

8. The routing switch in accordance with claim 1 wherein at least one of said input buffers comprises:

memory means for storing a plurality of data transmissions arriving at said routing switch via one of said buses, means for determining an output buffer that is to receive each data transmission stored in said memory means, and means for determining from said STATUS data whether any output buffer to which any of the data transmissions stored in said memory means is to be forwarded is idle, and for sending a routing request to said routing means when any one of the data transmissions stored in said memory means is to be forwarded by an idle output buffer, wherein said routing request identifies said idle output buffer.

9. The routing switch in accordance with claim 8 wherein the routing request identifies the output buffer that is to receive a longest-stored data transmission to be received by an output buffer said STATUS data indicates is idle.

10. The routing switch in accordance with claim 1 wherein the routing request identifies the output buffer that is to receive a longest-stored data transmission to be received by an output buffer said STATUS data indicates is idle.

\* \* \* \* \*